United States Patent
Kane et al.

[11] Patent Number: 6,141,778
[45] Date of Patent: Oct. 31, 2000

[54] METHOD AND APPARATUS FOR AUTOMATING SECURITY FUNCTIONS IN A COMPUTER SYSTEM

[75] Inventors: Kevin J. Kane, Woodland Park; Garrett K. Kolb, Monument, both of Colo.; Nora May, Sterling, Va.; Daniel E. Myer, Silver Spring, Md.; Jay B. Rutherford; Denise B. Shive, both of Colorado Springs, Colo.; Eleanor P. Weedon, Springfield, Va.

[73] Assignee: MCI Communications Corporation, Washington, D.C.

[21] Appl. No.: 09/106,726

[22] Filed: Jun. 29, 1998

[51] Int. Cl.⁷ .................................................. G06F 11/30
[52] U.S. Cl. ............................................................ 714/201
[58] Field of Search ............................. 713/200, 201, 713/202; 707/9; 709/225, 229

[56] References Cited

U.S. PATENT DOCUMENTS

| | | | |
|---|---|---|---|
| 5,263,157 | 11/1993 | Janis | 395/600 |
| 5,469,576 | 11/1995 | Dauerer et al. | 395/186 |
| 5,475,833 | 12/1995 | Dauerer et al. | 395/600 |
| 5,581,764 | 12/1996 | Fitzgerald et al. | 395/703 |
| 5,611,048 | 3/1997 | Jacobs et al. | 395/200.09 |
| 5,627,967 | 5/1997 | Dauerer et al. | 395/188.01 |
| 5,765,140 | 6/1998 | Knudson et al. | 705/9 |
| 5,765,153 | 6/1998 | Benantar et al. | 707/9 |
| 5,774,879 | 6/1998 | Custy et al. | 705/35 |
| 5,881,225 | 3/1999 | Worth | 395/186 |
| 6,000,033 | 12/1999 | Kelley et al. | 713/201 |

OTHER PUBLICATIONS

"IBM Resource Access Control Facility (RACF)," last updated Dec. 1999. (website) http://www.s390.ibm.com/products/racf/racfhp.html "AXENT: Counters Distributed Denial–of–Service". (website) http://www.axent.com/Axent/Public

*Primary Examiner*—Dieu-Minh T. Le
*Assistant Examiner*—Bryce P. Bonzo

[57] ABSTRACT

A computer security system automatically updates an access status and a level of access privilege for each user based on outside feeds related to current status of the user with respect to an organization, such as a business or school and the membership of the user in a group or department within the organization. A unique user identifier is assigned to each user across all computing systems. The computing system retains the relationship between the user and the user identifier even after the user's access to the computing system is terminated. The user may be reassigned the same user identifier should the user again be granted access to the system resources. The computing security system may be implemented as an overlay to an existing resource allocation system, such as the RACF system commonly found on many mainframe computers and may allow decentralization of certain security functions.

44 Claims, 8 Drawing Sheets

```
START
 COL   ----+----1----+----2----+----3----+----4----+----5----+----6----+----7----+----8
  7    *********************************************************
  7    *                                                        *
  7    * RACF TABLE                                             *
  7    *                                                        *
  7    *                                                        *
  7    *********************************************************
 12    ...
 12         DBID            CHAR (8) NOT NULL,
 14         USER            CHAR (8) NOT NULL,
 14         CREADATE        DATE NOT NULL,
 14         PASSDATE        DECIMAL (5, 0) NOT NULL,
 14         OWNER           CHAR (8) NOT NULL,
 14         INITDATE        DATE NOT NULL,
 14         ADSP            CHAR (1) NOT NULL,
 14         SPEC            CHAR (1) NOT NULL,
 14         OPER            CHAR (1) NOT NULL,
 14         RVKE            CHAR (1) NOT NULL,
 14         GAAC            CHAR (1) NOT NULL,
 14         AUDT            CHAR (1) NOT NULL,
 14         UAUD            CHAR (1) NOT NULL,
 14         SECLEVEL        SMALLINT NOT NULL,
 14         DFLTGRP         CHAR (8) NOT NULL,
 14         PWINTRVL        SMALLINT NOT NULL,
 14         REVOKEDT        DECIMAL (5, 0) NOT NULL,
 14         RESUMEDT        DECIMAL (5, 0) NOT NULL,
 14         CTGYCT          INTEGER NOT NULL,
 14         CLASCT          INTEGER NOT NULL,
 14         CONGRPCT        INTEGER NOT NULL,
 14         NAME            CHAR (20) NOT NULL,
 14         MODEL           VARCHAR (44) NOT NULL,
 14         INSTALL         VARCHAR (255) NOT NULL,
```

Prior Art

FIG. 2

METHOD AND APPARATUS FOR AUTOMATING SECURITY FUNCTIONS IN A COMPUTER SYSTEM

TECHNICAL FIELD

This invention relates to computers, computer networks, and more particularly to providing automated security in such systems.

BACKGROUND OF THE INVENTION

Computers and computing systems are often interlinked in a network to provide easy communications and data transfer between the various components of the network. Such networks may be composed of mainframes, minicomputers, and microcomputers, and may indeed be composed of combinations of all of the above. Each system on the network will typically operate under control of a software program, providing access to a database. In some systems, dummy terminals, or microcomputers configured to act as dummy terminals, will provide communications with the computing system.

Security for system resources and data stored on the system, are a primary concern for most computing systems. Many systems have been proposed for controlling access to computing resources and the data. For example, one of the most commonly used security systems for mainframe computers is the Resource Access Control Facility (RACF) provided by International Business Machines Corporation (IBM). The RACF employs controlling software on a mainframe associated with a RACF database. The RACF not only controls access to the computing system, but also controls the level or amount of access allowed to a user. In the RACF security system, a unique RACF user identifier is assigned to each user. Each RACF user identifier has a unique password to verify the identity of the user requesting access to the computing system.

The RACF enables organizations to define individuals and groups who use the system that the RACF protects. For example, a group may be defined that encompasses a collection of individuals having common needs and requirements. The RACF also enables an installation to define authority levels for a user or a group of users. The authority levels control what a user or member of a group can do on the system. The RACF also protects the system's resources, protecting an organization's information stored on the system by controlling which users have authority to access a system resource, such as a document or program.

The RACF stores all information about users, groups and resources in user, group and resource profiles. A profile is a record of RACF information that has been defined by a security administrator. A user profile provides user attributes that describe the system-wide and group-wide access privileges to protected resources for a user. Similarly, a group profile defines the authority that a user who is a member of the group has to access resources belonging to the group. A resource profile defines the type of authority a user needs to access a specific resource. A resource profile may contain an access list as well as a default level of access authority for the resources the profile protects. An access list identifies the access authorities of specific users and groups, while the default level of access authority applies to any user not specifically included in the access list.

As the number of computers or data centers increases, and as the number of users increase, the security system becomes more difficult to maintain. Even the process of assigning new user identifiers takes up an inordinate amount of time and expense.

Such computing systems are often used in businesses and schools. In such situations, each computing system or data center is often associated with a group or department within the business or school. As the number of users increases, the number of changes required to maintain the security system overwhelms the ability of security personnel to maintain the system. For example, the level of access privilege may be associated with a department to which a user is assigned. Each time the user is reassigned to a new department, security personnel have to adjust the level of access privilege for the user identifier assigned to that user.

Such a large system presents numerous problems for those in charge of system security. Problems may include assigning duplicate user identifiers to more than one user, failure to provide timely access for new users or to terminate access to terminated users in a timely manner, and failure to update the level of access privilege in a timely manner. A related problem, is the assignment of multiple user identifiers to a single user across a number of computing systems. Such multiple assignment makes it difficult for the user to remember the correct user identifier, often causing the user to write the user identifier and any associated password down, making the user identifier and password vulnerable to theft. Such multiple assignment of user identifiers may also make it difficult to screen the system for improper access privilege and level of access privilege. Such systems are particularly vulnerable to terminated employees and contractors, who may seek access to the system resources and/or data after the end date of their employment.

SUMMARY OF THE INVENTION

The present invention overcomes the limitations of the prior art and provides additional benefits by providing a centralized data center including a database and an overlay of software for automating maintenance of a security system across multiple data centers. The system provides for automatically updating access status based on an outside feed to the system concerning the status of the user associated with the user identifier, such as employment status. The system automatically maintains an access privilege level based on an outside feed related to a group or department to which a user associated with a user identifier belongs. The system automatically assigns a uniform user identifier to a user across all data centers or computing systems. Each user is assigned a unique user identifier, the user identifier being unique across all data centers. The system retains the association between the user identifier and the user even after access for the user has been terminated. The user is then automatically reassigned the same user identifier at a later date. The system provides for multiple reporting functions to ensure adequate security.

While the security system is discussed as an overlay to existing security systems on mainframes, such as RACF, the security system may be implemented with the mainframe or data center level security functions integrated into the security system. Also, while discussed in terms of mainframes, other networks of computers may also realize similar advantages, such as networks of minicomputers, workstations, microcomputers, or networks combining a combination of various computers.

In one exemplary embodiment, a method for automatically providing security in a computing system comprises assigning a key to one of a plurality of accounts, obtaining a group identifier from a database based on the key, and assigning a level of access privilege to the account that corresponds to a default level of access privilege associated with the group identifier.

In another exemplary embodiment, a method for automatically providing security in a computing system comprises assigning each user a unique user identifier, maintaining a database associating each of the users with the assigned identifiers, associating the user identifier with an account, automatically terminating the association between the identifier and the account when the user is terminated, and continually maintaining the relationship between the user identifier and the terminated user in the database after the association between the account and the user identifier has been terminated.

In a further exemplary embodiment, a method for providing security in a first and a second computing system comprises assigning each user a unique user identifier, automatically maintaining a database associating each user with the assigned user identifier, associating the user identifier assigned to the user with an account on the first computing system for each user that will be given access to the first computing system, and for each user that will be given access to the second computing system, automatically searching the database for the user and if the user exists in the database associating a previously assigned user identifier with an account on the second computing system, or associating a new user identifier with the account on the second computing system if the user does not exist in the database.

BRIEF DESCRIPTION OF THE DRAWINGS

FIG. 2 is a schematic diagram of an exemplary RACF data structure which resides in a RACF database on a computer.

DETAILED DESCRIPTION OF THE INVENTION

In the following description, certain specific details are set forth in order to provide a thorough understanding of various embodiments of the present invention. However, one skilled in the art will understand that the present invention may be practiced without these details. In other instances, well-known structures and methods associated with computers, computer networks, and related security have not been shown in detail in order to avoid unnecessarily obscuring the description of the embodiments of the invention.

Most organizations, including companies, schools, and other associations, are arranged in a hierarchical fashion. Such organizations may, for example, be composed of multiple companies, each company consisting of a number of departments. The people associated with the organization, such as employees associated with a business, and even the resources of the organization, such as computing systems, are often associated with a department or other grouping. Organizations rely on a hierarchical structure to establish management and accounting functions throughout the organization.

Many of the personnel and resources that comprise a department share similar tasks and authority. The exemplary embodiments of the present invention take advantage of the similarity in tasks and authority by assigning a default level of access privilege for the organization's computing resources to each account assigned to each member of the department. While all members of any given department receive the same default level of access privilege, the default level of access privilege between different departments may be varied according to the departments assigned tasks. A department member's level of access privilege may be modified from the department's default level of access privilege as the need arises.

Figure 1:
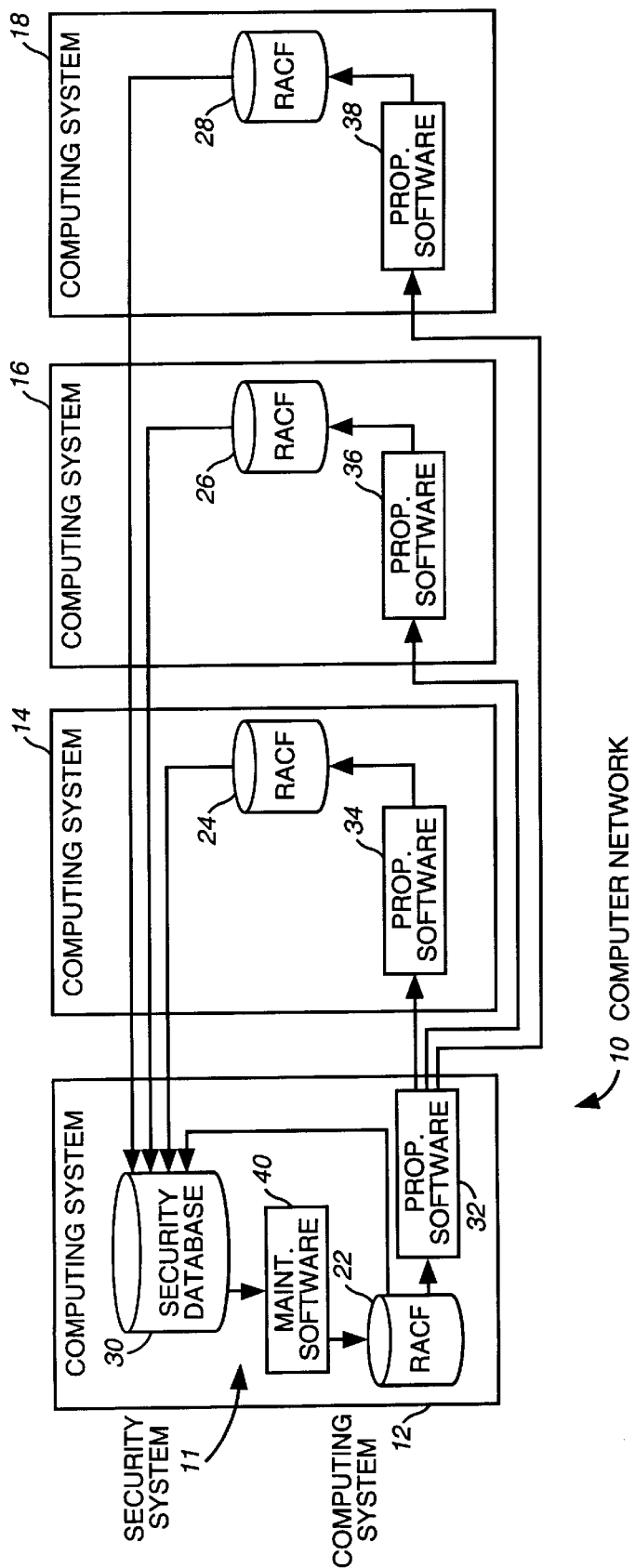
FIG. 1 is a logical block diagram of a computer network including an administrative data center and a number of networked data centers.

FIG. 1 shows a computer network 10 including multiple data centers, each of the data centers having at least one computing system associated therewith. A central computing system 12 is designated as a central repository for data related to a security system 11. The central computer system 12 is linked to a number of peripheral computing systems, such as computing systems 14, 16 and 18. Communication may be provided by conventional means such as fiber optic cable, infrared, or satellite transmission. While the computing system 12 has been designated as the central computing system, such designation should not be read to imply any particular topology on the system.

Each of the computing systems 12–18 has a respective RACF database 22–28. Each of the RACF databases 22–28 stores information for controlling access, access privilege level, passwords and authority for accessing the respective computing system. Relevant details of the RACF databases 22–28 will be discussed below.

The central computing system 12 includes a security database 30. The security database 30 includes numerous data structures or records that in conjunction with software provides for the automated maintenance of the security system across all of the data centers. The details of the specific data structures and their relationships will be discussed below.

Maintenance software 40 for interacting with the security database 30 may be resident in the central computing system 12 or in an external system (not shown). The software periodically updates the security database 30 and permits security personnel to generate reports and to make special updates of the system. Propagation software 32–38 automatically communicates changes in the central computing system's RACF database 22 to the peripheral computing systems 14–18 for updating the RACF databases 24–28, respectively. Propagation software is commercially available in packages such as NC-SYNCOM® from CKS, Inc.

FIG. 2 shows an exemplary data structure 52 for the RACF database 22–28. The RACF data structure 52 comprises a number of fields, of which only the ones particularly relevant to the invention will be discussed in detail. A user field 54 includes a user identifier. An RVKE field 56 holds a value that corresponds to an access status. The RVKE field 56 may be set to provide access or to deny access to the computing system for the user identifier associated with the RVKE field 56. The RACF data structure 52 includes a DFLTGRP field 58 which holds an eight character value that corresponds to a default group to which the user identifier is assigned. The RACF data structure 52 also includes an installation data field INSTALL 60, that may be customized for particular purposes.

Figure 3:
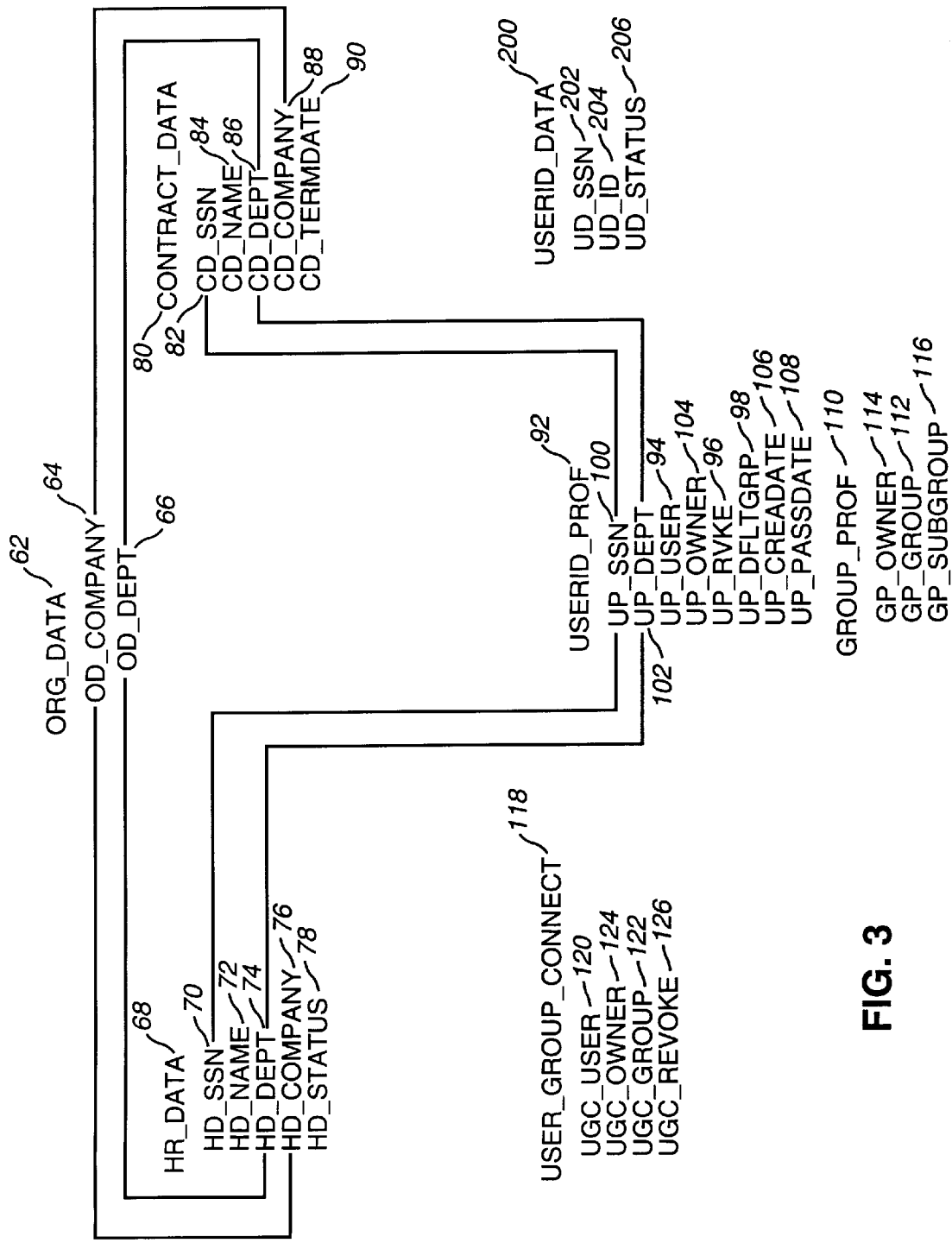
FIG. 3 is a block diagram showing various data structures of a security database.

FIG. 3 shows a number of data structures that comprise the security database 30 and which provide storage for data the security system 11 receives from various feeds. The data structures are shown in the form of tables of records having associated fields, although one skilled in the art will recognize that other data structures may be used. Data structures including ORG_DATA 62, HR_DATA 68 and CONTRACT_DATA 80 data structures store information relating to the organization and the personnel associated with the organization, such as employees and contractors. Data structures including USERID_PROF 92, GROUP_PROF 110 and USERID_DATA 200 data structures store information relating to user accounts on the computing systems 12–18. A data structure USER_GROUP_CONNECT 118 stores information that relates the data in the organizational data structures to the data in the user system account data structures. The specific details of the various data structures are discussed immediately below.

A data structure ORG_DATA 62 stores information about an organization, such as a business or school. The information may, for example, be related to a hierarchical structure of the organization, such as companies and departments. In the exemplary embodiment, a field OD_COMPANY 64 stores a company identifier, while a field OD_DEPT 66 stores a department identifier.

A data structure HR_DATA 68 stores information relating to members of the organization, such as the employees of a business. A field HD_SSN 70 stores an employee identifier such as a social security number, for uniquely identifying each employee. A field HD_NAME 72 stores the name of the employee associated with the unique employee identifier. A field HD_DEPT 74 and a field HD_COMPANY 76 store, respectively, a department identifier and a company identifier to which the employee is assigned. Similarly, a field HD_STATUS 78 stores a status, such as the employment status of the employee. One skilled in the art will understand that the labels chosen and the particular information represented is selected for convenience and the fields may relate to other groupings depending on the situation or organization using the security system. For example, department and company may correspond to the schools and departments of a university, while the employees correspond to registered students. The claims should therefore not be limited to the particular exemplary embodiment discussed.

A data structure CONTRACT_DATA 80 may hold data related to contractors that are working for the organization. The CONTRACT_DATA 80 structure includes a field CD_SSN 82 for storing a unique contractor identifier, such as the contractor's social security number. A field CD_NAME 84 is provided for storing the name of the contractor associated with the unique contractor identifier. A field CD_DEPT 86 and a field CD_COMPANY 88, respectively store a department identifier and a company identifier of the department and company to which the contractor is assigned. A field CD_TERMDATE 90 stores the termination date of a contract under which the contractor has been hired.

A data structure USERID_PROF 92 stores most of the information required for the RACF data structure 52 (FIG. 2), with the INSTALL field 60 customized for the application. The USERID_PROF data structure 92 includes a field UP_USER 94 to store a user identifier. A field UP_RVKE 96 stores an access status, such as access granted or access denied. A field UP_DFLTGRP 98 stores a group identifier of a group to which the employee associated with the user identifier belongs. A field UP_SSN 100 stores a unique employee or contractor identifier, such as the social security number. Thus an employee or contractor is associated to the user identifier through the USERID_PROF data structure 92. The USERID_PROF data structure 92, also includes a field UP_DEPT 102 for storing the department identifier for the employee or contractor associated with the user identifier. A field UP_OWNER 104 stores the identifier of an owner that has authority over the user identifier. Additionally, fields UP_CREADATE 106 and UP_PASSDATE 108 fields store the account creation and password creation dates, respectively.

A data structure GROUP_PROF 110 stores hierarchical ownership information for the computing system. A field GP_GROUP 112 stores a group identifier. A field GP_OWNER 114 stores an owner identifier for the group. A field GP_SUPRGROUP 116 stores a superior group identifier for the group. Each group has an owner, identified by the owner identifier and a superior group, identified by the superior group identifier. The owner of a group has authority to control the attributes associated with the group and the attributes associated with user identifiers in the group.

A data structure USER_GROUP_CONNECT 118 provides the connection between the user identifier and the group to which the user identifier belongs. A field UGC_USER 120 stores the user identifier, while a field UGC_GROUP 122 stores a group identifier. Additional fields may be provided, such as UGC_OWNER 124 for storing the identifier of an owner, and UGC_REVOKE 126 for storing an access status.

A data structure USERID_DATA 200 permanently stores user and user identifier relationships. The USERID_DATA 200 table includes a UD_SSN 202 field for storing a unique identifier, such as the user's social security number. A UD_ID 204 field stores the unique user identifier. A UD_STATUS 206 field stores the status of the user identifier. The USERID_DATA data structure 200, maintains the relationship between the user and the user identifier even if the user ceases her association with the business, school or organization. In this way, unique user identifiers may be assigned, and reassigned if the user should again become associated with the organization.

While certain fields of the data structures have been enumerated, each data structure may comprise additional fields for storing a variety of information, such as passwords, account creation date, password assignment date, and company information, such as information regarding the manager of the employee or contractor. Such additional information may also include location, addresses, telephone numbers and email addresses for the employees and the contractors. Such information may for example, be stored in fields in the HR_DATA 68 and CONTRACT_DATA 80 data structures.

Figure 4:
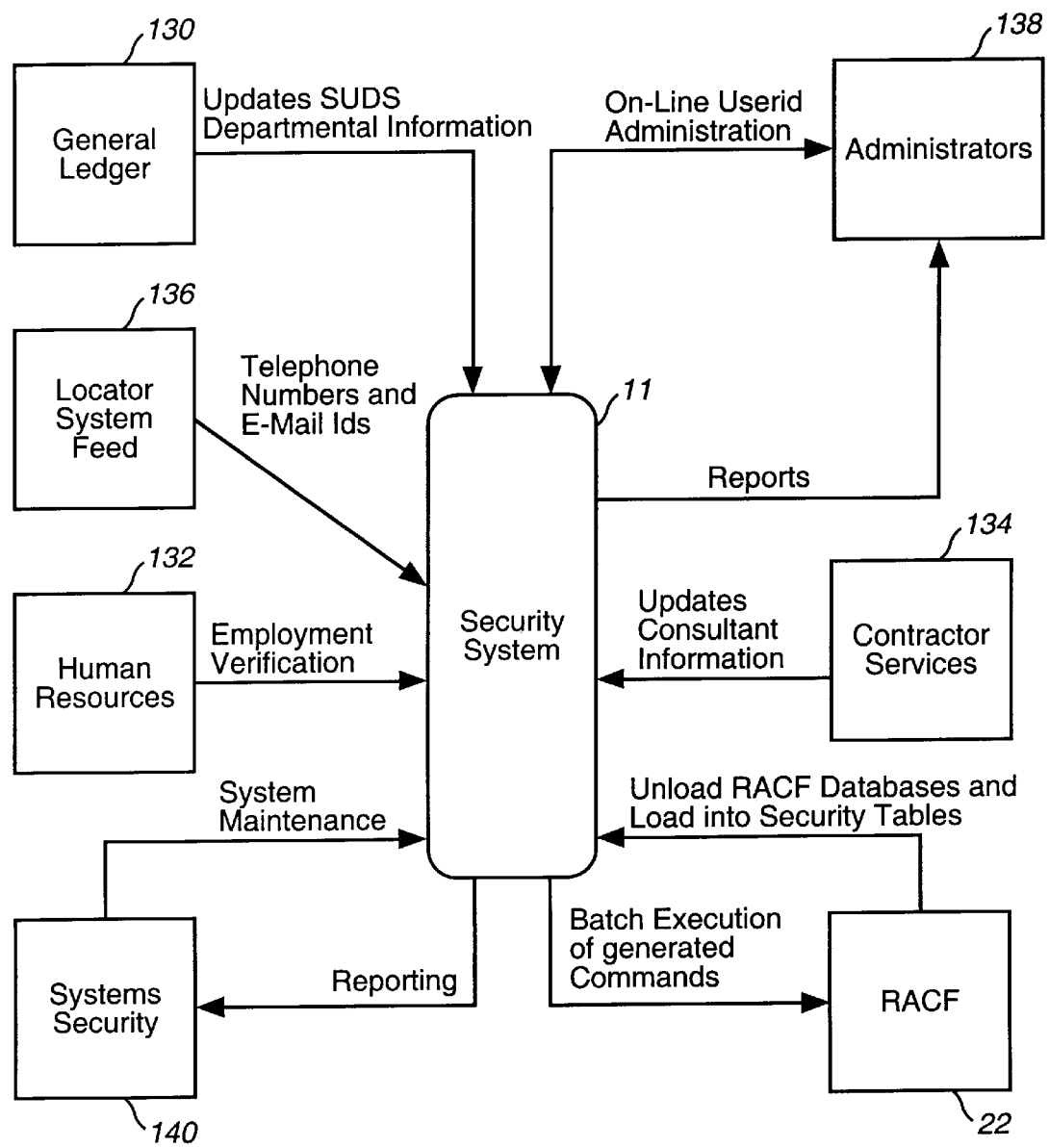
FIG. 4 is a block diagram showing data flows in the exemplary embodiment.

FIG. 4 shows the generalized inputs and outputs to the security system 11 for establishing and maintaining access authority and access privilege levels. The security system 11 automatically receives data for the fields of the above described data structures from various databases in various departments of the organization. The data comprising the inputs may reside on the central computing system 12, on the peripheral computing systems 14–18, or on other systems. The inputs will generally be used to update the security database 30 and for running verification checks on the data using the maintenance software 40. Similarly, the outputs from the security system 11 may reside on the central computing system 12, the peripheral computing systems 14–18, or other systems.

The security system 11 receives the organization's hierarchical structure information from a general ledger 130. The general ledger 130 includes information such as the organization's departments with associated department identifiers, and the organization's companies, if appropriate. Many companies, schools, and other organizations maintain a general ledger to assist in managing and accounting for the organization. Often, it is the duty of a management department to maintain the general ledger 130. Computer security personnel will often not know of the addition or deletion of departments until long after such changes have been made. The present security system 11 remedies this problem, as will be described below.

Many companies have a human resources department that maintains information regarding employees in a database. The security system 11 receives employee information from a human resources database 132. The human resources database 132 will typically include personal information such as, employee's social security number, employee's name, home address and telephone number. The human resources database 132 will also typically include work related information such as, the employee's work address, company, department, paycode or salary information and employment status. The human resources database 132 may also include information regarding the employee's supervisor. The security system 11 may directly access the human resources database 132, or the human resources department may provide periodic extracts of the human resources information to the security system 11.

Similarly, many companies will have a department that maintains information regarding contractors in a database. The security system 11 receives contractor information from a contractor services database 134. Such information may include, the contractor's name and social security number, the company and department to which the contractor is assigned, and the termination date of the contract under which the contractor has been hired. The security system 11 may directly access the contractor services database 134, or the contractor services department may provide periodic extracts of the contractor information to the security system 11.

Additional information about the employees and contractors, such as work related telephone numbers and e-mail address may be stored in a locator system database 136. The security system 11 may directly access the locator system database 136, or extracts of the locator information may be periodically provided to the security system 11.

In order to decentralize control, and to permit rapid updates, administrators 138 are assigned in each department. The administrators 138 are given authority through the security system 11 to set and change the attributes for user accounts assigned to users in the administrator's department. The administrators 138 also receive reports generated by the security system 11 regarding the user identifiers over which the administrators 138 have authority.

Systems security personnel 140 have authority through the security system 11 over all user identifiers, including those assigned to administrators 138. Systems security personnel 140 will often also have RACF authority, allowing the system security personnel 140 to directly modify the RAFC attributes at the RACF level of mainframe security. An input/output device such as a terminal (not shown) provides security personnel with access to information, reports and control over the security system.

Figure 5:
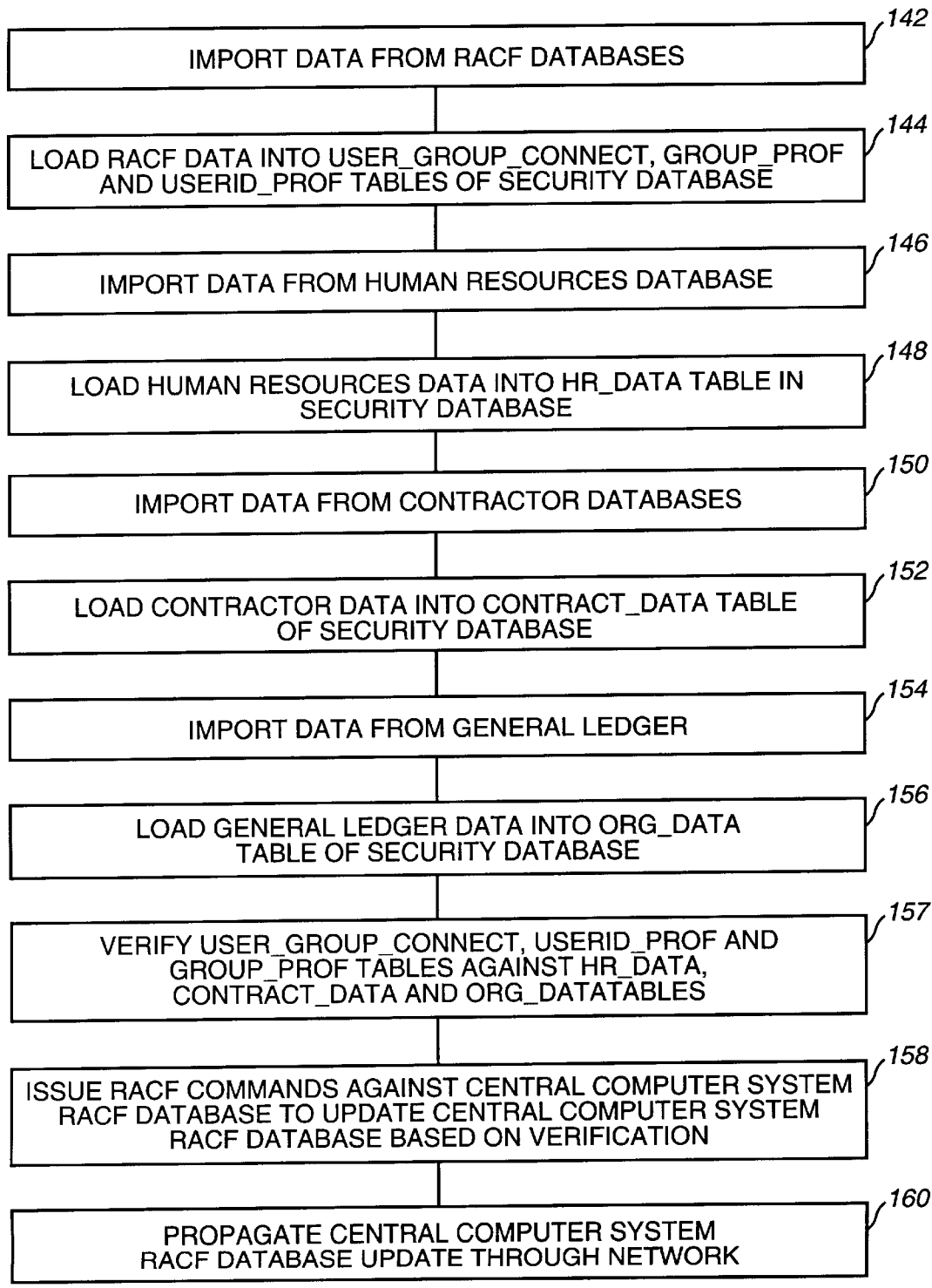
FIG. 5 is a block diagram according to an exemplary embodiment, illustrating a logical process of periodically updating the security database.

The security system 11 interacts with the RACF database 22 on the central computing system 12 for receiving data and issuing RACF commands. An exemplary method of periodically updating the security database 30 is shown in FIG. 5. FIG. 5 is not an exhaustive flowchart, and additional steps may be added and other steps deleted as the situation requires. In step 142, the RACF databases 22–28 are unloaded by the security system 11 periodically, such as nightly. In step 144, the unloaded data from the RACF databases 22–28 populates the USER_GROUP_CONNECT 118, GROUP_PROF 110 and USERID_PROF 92 data structures of the security database 30. In step 146, the security system imports the human resources data from the human resources database 132. In step 148, the human resources data populates the HR_DATA 68 table of the security database 30. Similarly, in step 150, the security system 11 imports the contractor data from the contractor services database 134 and uses the contractor data to populate the CONTRACT_DATA 80 table of the security database 30 in step 152. In step 154 the security system imports organizational data from the general ledger 130, and in step 156 uses the imported organizational data to populate the ORG_DATA 62 table of the security database 30. One skilled in the art will note that data such as the organizational data does not change frequently and therefore may be loaded into the security database 30 on a less frequent schedule than the other data.

In step 157, the security system 11 uses the data in the HR_DATA 68, CONTRACT_DATA 80 and ORG_DATA 62 tables to verify the accuracy of the data loaded into the USER_GROUP_CONNECT 118, USERID_PROF 92 and GROUP_PROF 110 tables from the RACF databases 22–28. For instance, the security system 11 may verify that the department to which an employee or contractor is assigned has not changed. The security system 11 may also verify the status of each employee and termination date of each contractor. In cases where the data is inconsistent, the security system 11 issues RACF commands to update the RACF database 22 on the central computing system 12, as in accord with step 158. The security system 11 may also automatically provide a message to system security personnel, the administrator 138 or the user regarding any changes in access or level of access privilege. Where a user's access is being terminated, the user identifier assigned to the user may be associated with a hold account, by issuing a RACF command. The hold account is owned by the security personnel and does not permit the user to access any of the computing systems 12–18. As discussed above, the propagation software 32–38 propagates the changes made to the RACF database 22 to the peripheral computers 14–18, where the respective RACF databases 24–28 are updated. In this way, security is maintained across the entire network of computers 10.

Figure 6:
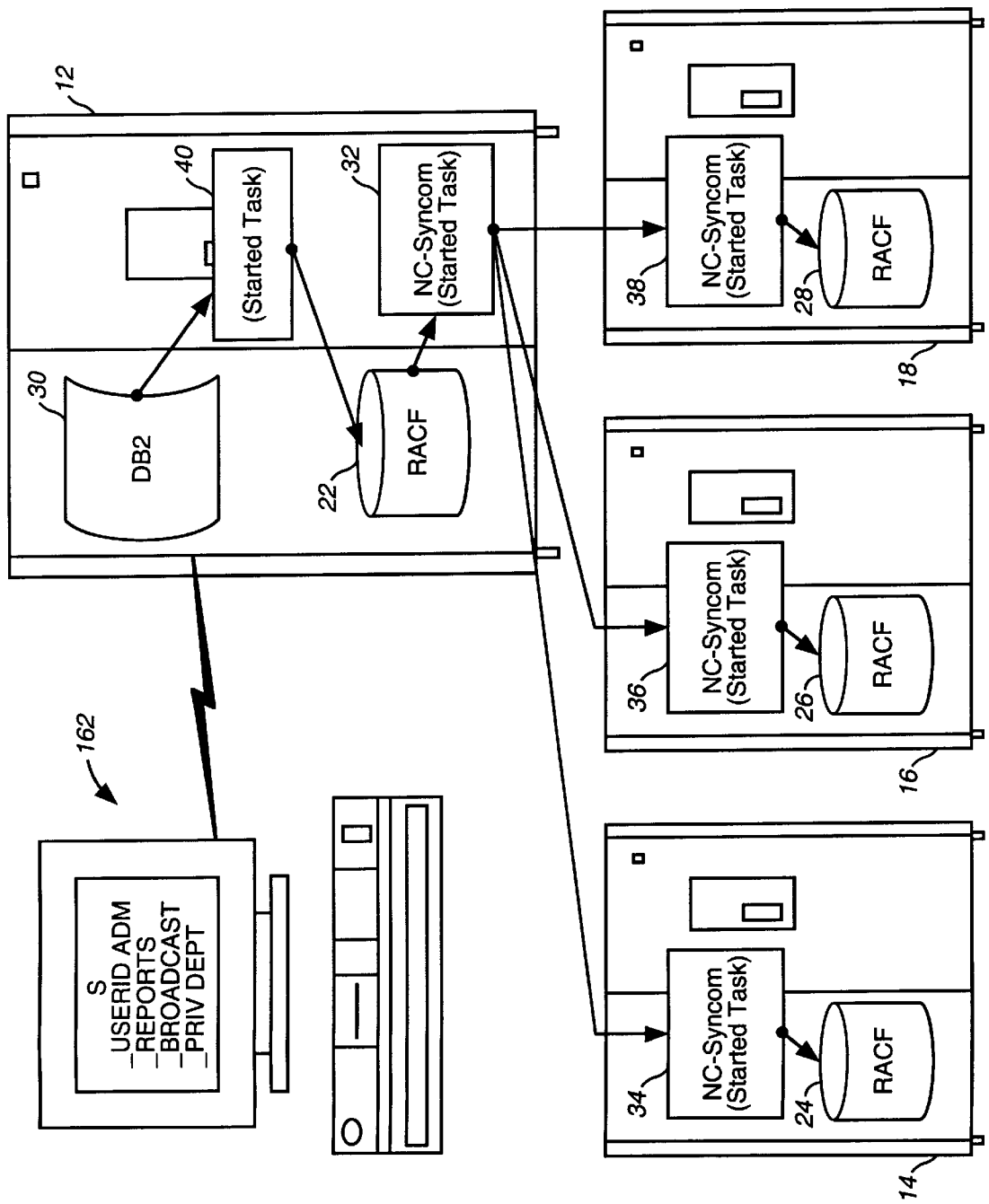
FIG. 6 is a logical block diagram of the computer network including a terminal for providing input and output to an administrator.

FIG. 6 shows an exemplary embodiment of the computer network 10 and the general data flow in the computer network 10 for the situation in which the administrator 138 (FIG. 4) selectively updates data for a particular user or user identifier, such as assigning a user identifier. A terminal 162 is coupled to the central computing system 12 for permitting the administrator 138 (FIG. 4) to access user information and to assign user identifiers. The general data flow shown of FIG. 6 is described in further detail below, with reference to FIGS. 7 and 8.

Figure 7:
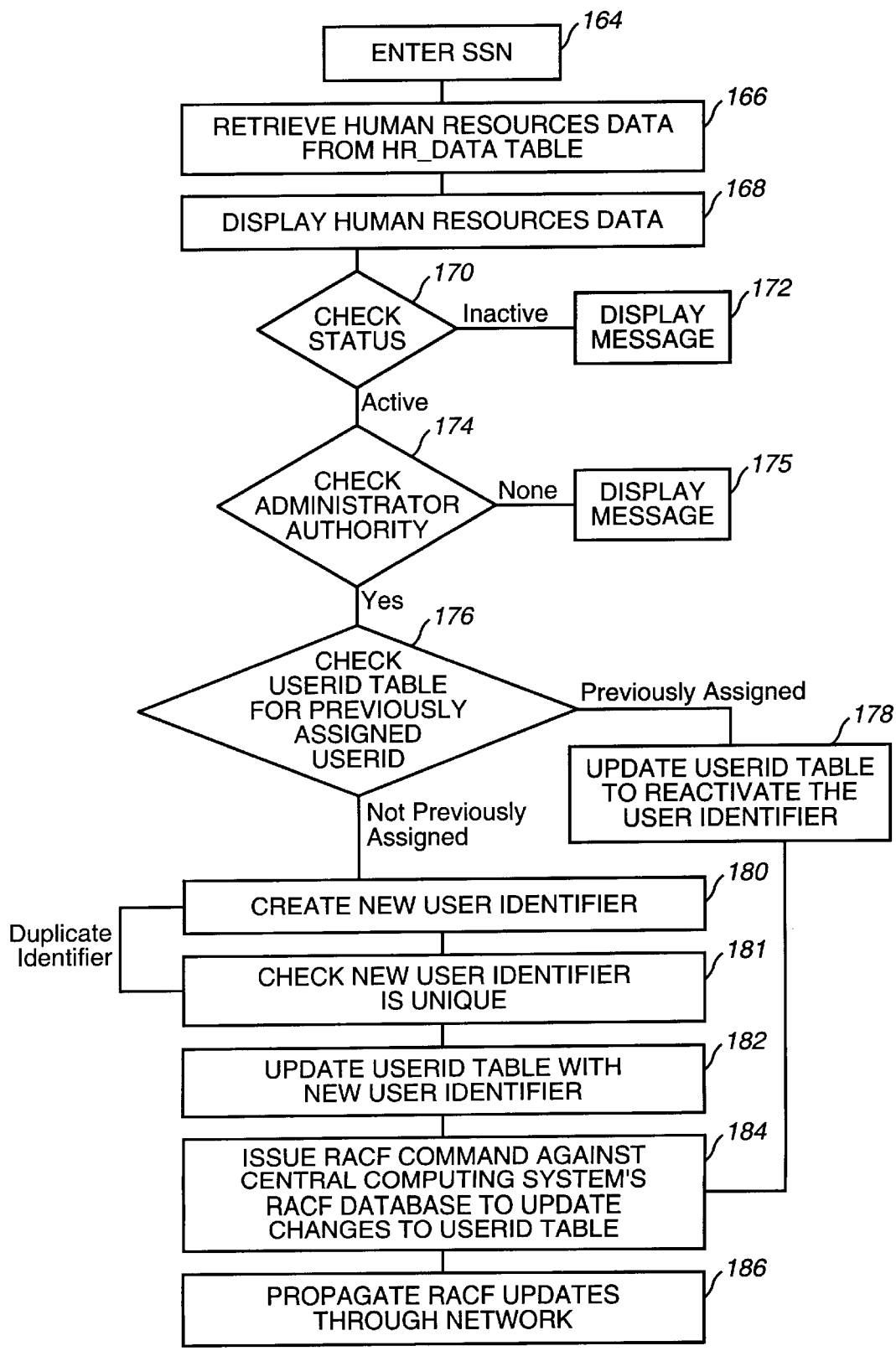
FIG. 7 is a flow diagram according to an exemplary embodiment, illustrating a logical process of assigning a user identifier an employee.

FIG. 7 shows an exemplary embodiment of the steps performed by the administrators 138 in periodically assigning a user identifier to an employee on the computer network 10 of FIG. 6. In step 164, the administrator enters the employee's social security number on the terminal 162. In step 166, the security system 11 retrieves human resources data about the employee from the HR_DATA 68 table of the security database 30. In step 168, the security system 11 displays the retrieved human resources data on the terminal 162. The security system 11 checks the HD_STATUS 78 field of the HR_DATA 68 data structure to determine the employment status of the user in step 170. If the employment status is inactive, then in step 172 the security system 11 displays a message telling the administrator 138 that the employee is on inactive status and may not be assigned a user identifier. If the employment status is active, then the security system 11 determines whether the administrator 138 has authority to assign a user identifier to the employee, as in step 174. In step 175, the administrator 138 is prompted with a message if the administrator 138 does not have authority over the user.

In step 176, the security system 11 checks to determine whether the employee has been previously assigned a user identifier. The security system inspects the UD_SSN 202 field of the USERID_DATA 200 table for matches to the employee's identifier. If the employee has already had a user identifier assigned, the previous user identifier will be reactivated. In step 178, the security system 11 updates the UD_STATUS 206 field of the USERID_DATA table 200 as a first step in reactivating the user identifier. If no previous user identifier has been assigned, the security system 11 generates a new user identifier in step 180. At least some portion of the user identifier should be randomly generated to provide a high degree of security for the security system 11. In step 181, the security system 128 verifies that the new user identifier is unique by checking the USERID_DATA data structure 200. The security system 128 generates another new user identifier if the previously generated user identifier is not unique. In step 182, the security system 11 updates the USERID_DATA table 200 with the new user identifier. The appropriate level of access privilege is automatically assigned to the user by way of the relationship between the fields of the various data structures HR_DATA 68, USERID_PROF 92, GROUP_PROF 110 and USER_GROUP_CONNECT 118.

The security system 11 then issues a RACF command, in step 184, against the RACF database 22 of the central computing system 12 to update the RACF database 22 with the changes made to the USERID_DATA 200 table. In step 186, the changes in the central computing system's 12 RACF database 22 are propagated through the network to the appropriate RACF databases 24–28 of the peripheral computing systems 14–18.

Figure 8:
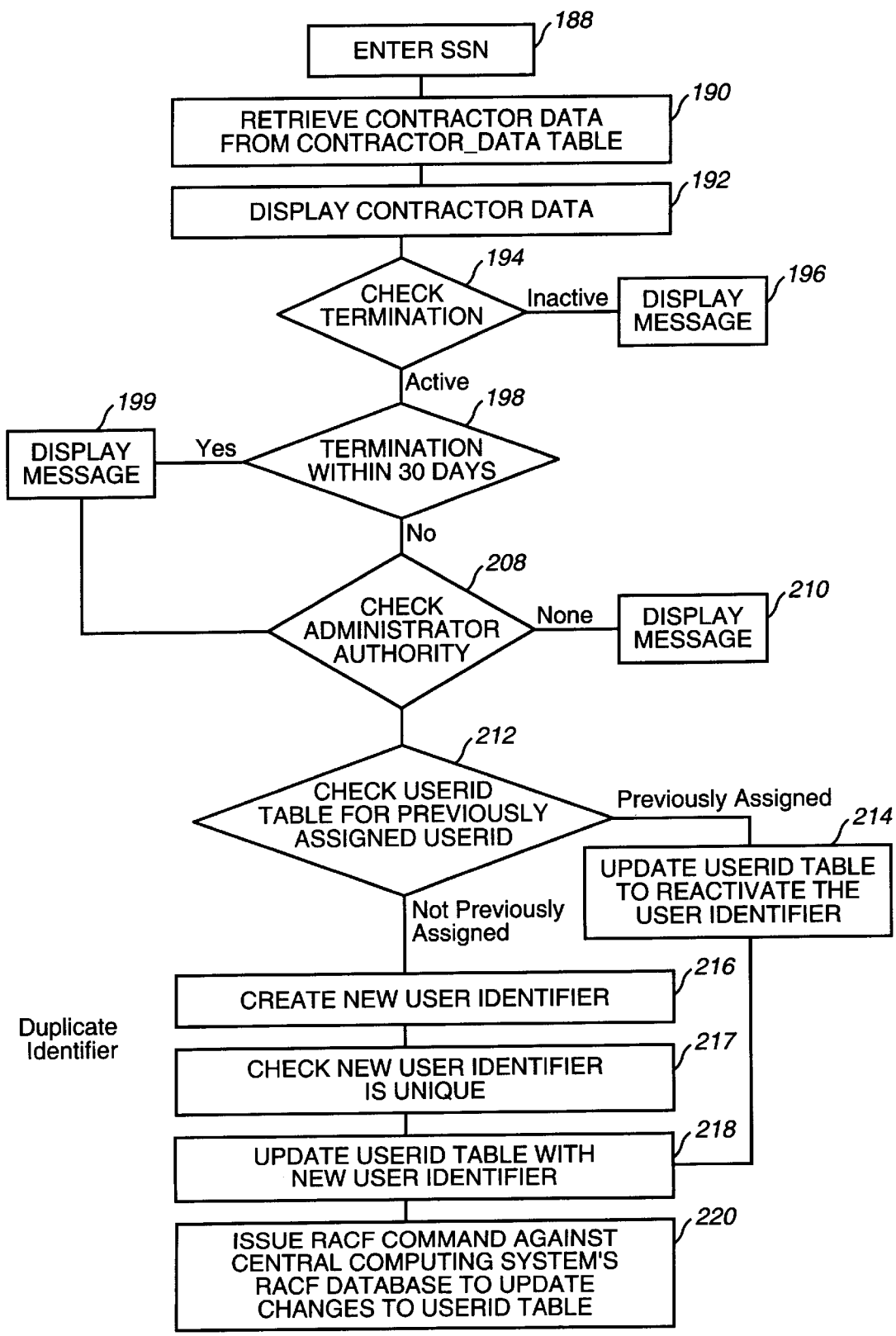
FIG. 8 is a flow diagram according to an exemplary embodiment, illustrating a logical process of assigning a user identifier to a contractor.

FIG. 8 shows an exemplary embodiment of the steps performed by the administrators 138 in periodically assigning a user identifier to a contractor on the computer network 10 of FIG. 6. In step 188, the administrator enters the contractor's social security number on the terminal 162 (FIG. 6). In step 190, the security system 11 retrieves contractor data about the contractor from the CONTRACT_DATA 80 table of the security database 30. In step 192, the retrieved contractor data is displayed on the terminal 162 (FIG. 6). The security system 11 checks the CD_TERMDATE 90 field of the CONTRACT_DATA 80 table to determine the termination date of the contractor in step 194. If the termination date is at or before the current date, the contractor has been terminated and, in step 196, the security system 11 displays a message telling the administrator 138 that the contractor is terminated and may not be assigned a user identifier. The security system 11 may also determine whether the termination date is within some set period of the current date, as in step 198, and provide a message warning the administrator 138 that the contract will soon terminate, as in step 199. If the contractor's status is active then the security system 11 determines whether the administrator 138 has authority to assign a user identifier to the contractor, as in step 208. In step 210, the administrator 138 is prompted with a message if the administrator 138 does not have authority over the user.

Steps 212–220 of FIG. 8 are similar to steps 176–184 of FIG. 7, whereby the security system 11 determines whether the contractor has been previously assigned a user identifier, reactivates a previously assigned user identifier or generating a unique new user identifier, updates the fields of the data structures appropriately and issues RACF commands against the RACF database 22 of the central computing system 12. The changes in the central computing system's 12 RACF database 22 are propagated through the network to the appropriate RACF databases 24–28 of the peripheral computing systems 14–18 in a manner similar to that shown in step 186 of FIG. 7.

In a similar manner, the administrators 128 may authorize additional access for a user identifier such as time sharing access (TSO) to one of the computing systems 12–18, or may revoke a user identifier, resume a revoked user identifier, or reset passwords.

Additionally, the systems security personnel may grant a level of access privilege different from the default level of access privilege assigned to the user identifier based on the department to which the user of the user identifier belongs. This is accomplished by issuing appropriate RACF commands against each of the relevant RACF databases 22–28.

Although specific embodiments of, and examples for, the present invention are described herein for illustrative purposes, various equivalent modifications may be made without departing from the spirit and scope of the invention, as will be recognized by those skilled in the relevant art. The teachings provided herein of the present invention may be applied to computer networks in schools, associations, and other organizations not necessarily the exemplary business based computer network generally described above. Accounts having user identifiers may be assigned to individuals, groups of individuals, or even inanimate objects, such as other computers. The organization employing the system may not have an equivalent of a company hierarchy, but may consist of a number of groups that equate to departments. The choice of a business structure to describe the exemplary embodiment was selected for convenience, and one skilled in the art will recognize that the names of the various data structures and fields do not imply any particular information necessary for practicing the invention. For example, the social security number is not required, and any unique identifier may be used. Additionally, the security system may work with other computer based security systems, not necessarily Resources Access Control Facility described in the exemplary embodiments.

These and other changes may be made to the invention in light of the above-detailed description. In general, in the following claims, the terms used should not be construed to limit the invention to the specific embodiments disclosed in the specification and the claims, but should be construed to include all automated security systems and methods of operating such security systems that operate in accordance with the claims. Accordingly, the invention is not limited by the disclosure, but instead its scope is to be determined entirely by the following claims.

What is claimed is:

1. A method for providing security in a computing system, the computing system having a plurality of accounts, each account having a level of access privilege associated therewith, the plurality of accounts being respectively assigned to a plurality of users, the method comprising:

for one of the plurality of accounts, obtaining a department identifier from a human resources database, the department identifier corresponding to a department to which the user assigned to the account is assigned; and automatically assigning a level of access privilege to the account, the level of access privilege corresponding to a default level of access privilege associated with the department to which the department identifier corresponds.

2. The method of claim 1, further comprising:

periodically automatically checking the human resources database for an employment status value corresponding to an employment status of the user to which the account is assigned; and updating an access privilege for the account if the employment status value for the user that the account is assigned to has changed.

3. The method of claim 1, further comprising:

periodically automatically checking the human resources database for an employment status value corresponding to an employment status of the user to which the account is assigned;

updating an access privilege for the account if the employment status value for the user that the account is assigned to has changed; and automatically providing a notice of a change in the access privilege prior to performing the step of updating the access privilege.

4. The method of claim 1, further comprising:

periodically automatically checking the human resources database for the department identifier corresponding to the department to which the user assigned to the account is assigned; and updating the level of access privilege for the account if the department identifier for the user to which the account is assigned has changed.

5. The method of claim 1, further comprising:

periodically automatically checking the human resources database for the department identifier corresponding to the department to which the user assigned to the account is assigned;

updating the level of access privilege for the account if the department identifier for the user to which the account is assigned has changed; and automatically providing a notice of a change in the level of access privilege prior to performing the step of updating the level of access privilege.

6. The method of claim 1 wherein the one of the plurality of users is a contractor having a contract termination date, and further comprising:

automatically providing a notice of a termination in access privilege at a defined period prior to the contract termination date.

7. The method of claim 1, further comprising:

assigning a unique user identifier to each of the plurality of users; and associating the assigned user identifier with the account assigned to the user.

8. The method of claim 1, further comprising:

assigning a unique user identifier to each of the plurality of users;

associating the assigned user identifier with the account assigned to the user; and maintaining the assignment between the user identifier and the user after terminating the association between the assigned user identifier and the account.

9. The method of claim 1, further comprising:

assigning a unique user identifier to each of the plurality of users;

associating the assigned user identifier with the account assigned to the user;

maintaining the assignment between the user identifier and the user after terminating the association between the assigned user identifier and the account; and associating the assigned user identifier with a new account assigned to the user.

10. The method of claim 1, further comprising:

associating a password with each of the plurality of accounts.

11. The method of claim 1 wherein the one of the plurality of users comprises an individual.

12. The method of claim 1 wherein the one of the plurality of users comprises a group of individuals.

13. The method of claim 1 wherein the one of the plurality of users comprises a unit defined for accounting purposes based on user function.

14. A method for automatically providing security in a computing system, the computing system having a plurality of accounts, the method comprising:

assigning a key to one of the plurality of accounts in the computing system;

obtaining a group identifier from a database based on the key; and automatically assigning a level of access privilege to the one of the plurality of accounts that corresponds to a default level of access privilege that is associated with the group identifier.

15. The method of claim 14 wherein the key corresponds to a user and the step of obtaining a group identifier from a database based on the key comprises:

receiving a department identifier from a human resources database, the department identifier corresponding to a department to which the user is assigned.

16. The method of claim 14, further comprising:

periodically automatically checking the database for a change in the group identifier corresponding to the key; and updating the level of access privilege of the one of the plurality of accounts corresponding to the key based on the change in the group identifier.

17. The method of claim 14 wherein the key corresponds to a user, and further comprising:

periodically checking a human resources database for a department identifier that corresponds to a department to which the user is assigned; and updating the level of access privilege of the one of the plurality of accounts corresponding to the key based on the change in the group identifier.

18. The method of claim 14, further comprising:

periodically checking the database for a change in an access variable that corresponds to an access status for the key assigned to the account; and updating the access status of the one of the plurality of accounts corresponding to the key based on the change in the access variable.

19. The method of claim 14, further comprising:

periodically automatically checking the database for an access variable that corresponds to an access status for the key assigned to the account; and reassigning the key from the one of the plurality of accounts to a holding account if the access status corresponds to a terminated condition.

20. The method of claim 14 wherein the key corresponds to a user, the access status corresponds to an employment status, and further comprising:

periodically automatically checking a human resources database for an employment status variable that corresponds to an employment status of the user; and reassigning the key from the one of the plurality of accounts to a holding account if the employment status variable corresponds to a terminated condition.

21. The method of claim 14 wherein the key corresponds to a user, the access status corresponds to a status, and her comprising:

periodically automatically checking a database for a access status variable that corresponds to a status of the user; and reassigning the key from the one of the plurality of accounts to a holding account if the status variable corresponds to an unassigned condition.

22. The method of claim 14, further comprising:

associating a unique user identifier with each of the plurality of accounts.

23. The method of claim 14, further comprising:

associating a password with each of the plurality of accounts.

24. The method of claim 14 wherein the one of the plurality of accounts is associated with an individual.

25. The method of claim 14 wherein the one of the plurality of accounts is associated with a group of individuals.

26. A method of providing security in a computing system accessed by a plurality of users, the computing system having a plurality of accounts, the method comprising:

assigning each user a unique user identifier;

maintaining a database associating each of the plurality of users with a respective one of the assigned user identifiers;

associating the user identifier with a one of the plurality of accounts;

automatically terminating the association between the user identifier and the one of the plurality of accounts when an access variable corresponding to the user to whom the user identifier is assigned is equal to a first condition;

continually maintaining a relationship between the user identifier and the terminated user identifier in the database after the association between the one and user identifier has been automatically terminated; and automatically reestablishing the association between the account and the user identifier if the access variable corresponding to the user that the user identifier has been assigned to is equal to a second condition.

27. The method of claim 26 wherein the step of assigning each user a unique user identifier comprises:

searching the database for the user; and assigning the user identifier previously assigned to the user if the user exists in the database.

28. The method of claim 26 wherein the step of assigning each user a unique user identifier comprises:

selecting a new user identifier that is unique relative to the user identifiers in the database if the database does not contain a previously assigned user identifier for the user.

29. A method of providing security in a first computing system and a second computing system, the first computing system being accessed by a first plurality of users and the second computing system accessed by a second plurality of users, each of the users in the first and the second plurality of users being respectively identified by a user key, each of the first and the second computing systems having a plurality of accounts, the method comprising:

assigning each of the first plurality of users a unique user identifier;

automatically maintaining a database associating each of the user keys with the corresponding assigned user identifier;

for each user of the first plurality of users, associating the user identifier assigned with one of the plurality of accounts on the first computing system to provide access to the first computing system; and for each user of the second plurality of users, automatically searching the database for the user key identifying the user and associating a previously assigned user identifier with an account on the second computing system if the user key exists in the database, and associating a new user identifier with the account on the second computing system if the user key does not exist in the database, to provide access to the second computing system.

30. The method of claim 29 wherein the user key comprises a social security number of the user.

31. The method of claim 29 wherein the user key comprises a name of the user.

32. The method of claim 29 wherein the step of assigning each user a unique user identifier comprises:

automatically maintaining the association between the user key and the assigned user identifier after the association between the user identifier and the account on the first computing system is terminated.

33. The method of claim 29 wherein the step of assigning each user a unique user identifier comprises:

automatically maintaining the association between the user key and the assigned user identifier after the association between the user identifier and the account on the second computing system is terminated.

34. The method of claim 29 wherein the step of assigning each user a unique user identifier comprises:

automatically maintaining the association between the user key and the assigned user identifier after the associations between the user identifier and the account on the first computing system, and between the user identifier and the account on the second computing system are terminated.

35. The method of claim 34 wherein the step of assigning each user a unique user identifier further comprises:

searching the database for the user key;

assigning the user identifier previously assigned to the user if the user exists in the database; and selecting a new user identifier that is unique relative to the user identifiers in the database if the database does not contain a previously assigned user identifier for the user key.

36. The method of claim 32 wherein the step of assigning each user a unique user identifier comprises:

reestablishing the association between the user identifier and the account on the first computing system.

37. The method of claim 33 wherein the step of assigning each user a unique user identifier comprises:

reestablishing the association between the user identifier and the account on the second computing system.

38. A computer-readable medium having stored therein a computer readable program used by a computing system in providing a number of different levels of access to an account on the computing system, the computer readable program comprising the steps of:

assigning a user identifier to an account;

associating the user identifier with a user;

associating the user with a predefined group; and associating the predefined group with a default level of access privilege.

39. The computer-readable medium of claim 38, further comprising:

updating the level of access each time the user is associated with a different predefined group.

40. The computer-readable medium of claim 38 wherein the predefined group comprises a department and associating the user with a predefined group comprises accessing a human resources relational database containing associations between a number of users and a number of departments.

41. The computer-readable medium of claim 38, further comprising:

associating the user with an access variable corresponding to an access status; and terminating the association between the user identifier and the account when the access status is equal to a terminated condition.

42. In a computer system having at least one data center, an apparatus comprising:

a first data structure interrelating a user identifier and a user account;

a second data structure interrelating a user and the user identifier;

a third data structure interrelating the user and an assigned department;

a fourth data structure interrelating department and a default level of security privilege; and a computer coupled to the first, the second, the third and the fourth data structures and being programmed for assigning a default level of access privilege corresponding to the department to which the user associated with the user identifier has been assigned.

43. A method for automatically providing security in a computing system comprising a RACF database, the method comprising:

receiving a set of account data from the RACF database into a security database, the account data comprising a user identifier and a group identifier for each of a plurality of accounts on the computing system;

receiving a set of user data into the security database, the set of user data comprising a user identifier and a group identifier for each of a plurality of users on the computing system; and for at least one of the user identifiers, comparing the group identifier of the account data with the group identifier of the user data and issuing a command against the RACF database to update a group identifier in the RACF database with the group identifier of the user data when the group identifier of the account data is different from the group identifier of the user data.

44. The method of claim 43 wherein the account data further comprises an access status and wherein the user data further comprises an access status, the method further comprising:

for each user identifier, comparing the access status of the account data with the access status of the user data, and issuing a RACF command against the RACF database to update an access status in the RACF database with the access status of the user data when the access status of the account data is different from the access status of the user data.

* * * * *